United States Patent [19]

Reid

[11] Patent Number: 4,722,785
[45] Date of Patent: * Feb. 2, 1988

[54] PARTIAL OR NON-BARRIERED OXIDATION DITCH HAVING MOMENTUM CONSERVATION AND INCREASED OXYGEN TRANSFER EFFICIENCY

[76] Inventor: John H. Reid, 7 Stansbury Ct., Fredericksburg, Va. 22401

[*] Notice: The portion of the term of this patent subsequent to Apr. 29, 2003 has been disclaimed.

[21] Appl. No.: 854,429

[22] Filed: Apr. 21, 1986

Related U.S. Application Data

[63] Continuation-in-part of Ser. No. 433,638, Oct. 12, 1982, Pat. No. 4,585,555, which is a continuation-in-part of Ser. No. 361,205, Mar. 29, 1982, Pat. No. 4,455,232, which is a continuation-in-part of Ser. No. 75,412, Sep. 14, 1979, Pat. No. 4,394,268, which is a continuation-in-part of Ser. No. 28,383, Apr. 9, 1979, Pat. No. 4,278,547, which is a continuation-in-part of Ser. No. 848,705, Nov. 4, 1977, abandoned, which is a continuation-in-part of Ser. No. 649,995, Jan. 19, 1976, abandoned.

[51] Int. Cl.$^4$ .................................................. C02F 3/20
[52] U.S. Cl. ...................................... 210/194; 210/220; 210/926; 210/261; 261/DIG. 75; 261/124; 261/93
[58] Field of Search ............ 210/627, 629, 194, 195.3, 210/170, 219, 220, 221.1, 221.2, 628, 319, 320, 926, 261; 261/36 R, 91, 93, 124, DIG. 75

[56] References Cited

U.S. PATENT DOCUMENTS

| | | | |
|---|---|---|---|
| 3,846,292 | 4/1971 | Lecompte, Jr. | 210/926 |
| 3,897,000 | 7/1975 | Mandt | 239/177 |
| 3,990,974 | 11/1976 | Sullins | 210/96 |
| 4,199,452 | 4/1980 | Mandt | 210/104 |
| 4,278,547 | 7/1981 | Reid | 210/926 |
| 4,365,938 | 12/1982 | Warinner | 417/54 |
| 4,440,645 | 4/1984 | Kite | 210/626 |
| 4,455,232 | 6/1984 | Reid | 210/926 |
| 4,521,307 | 6/1985 | Reid | 210/926 |
| 4,537,679 | 8/1985 | Reid | 210/219 |
| 4,585,555 | 4/1986 | Reid | 210/926 |

FOREIGN PATENT DOCUMENTS

| | | | |
|---|---|---|---|
| 2300373 | 1/1972 | Fed. Rep. of Germany | 210/926 |
| 166160 | 9/1974 | Hungary | 210/926 |
| 729 | of 1915 | United Kingdom | 210/926 |

Primary Examiner—Benoit Castel
Attorney, Agent, or Firm—Marion P. Lelong

[57] ABSTRACT

An improved barrier oxidation ditch is provided which has a channel portion for unaerated induced-flow and an inclined duct for aerated induced flow, whereby energy in the dammed-up momentum is more efficiently released. This induced-flow duct is incided at 30° to 60° to the horizontal, preferably 45°, and is disposed upstream of, downstream of, or alongside of the circulator/aerator in the intake channel. The induced-flow duct is preferably rectangular in cross-section and may have its downstream wall formed by the baffle if it is downstream of the circulator/aerator. The induced-flow duct is connected at its lower end to the discharge duct to initiate a combined-flow portion thereof. This combined-flow portion has an upper side which may be a thin wall or may be a much thicker aerator bridge. A baffle may be mounted downstream of the inlet of the induced flow duct for selectively restricting the amount of unaerated induced flow. The baffle may be fixed in position, or it may be slideably or swingedly adjustable. The combined flow portion provides prolonged bubble retention time at maximum hydraulic pressure, whereby the efficiency of oxygen transfer is increased.

18 Claims, 7 Drawing Figures

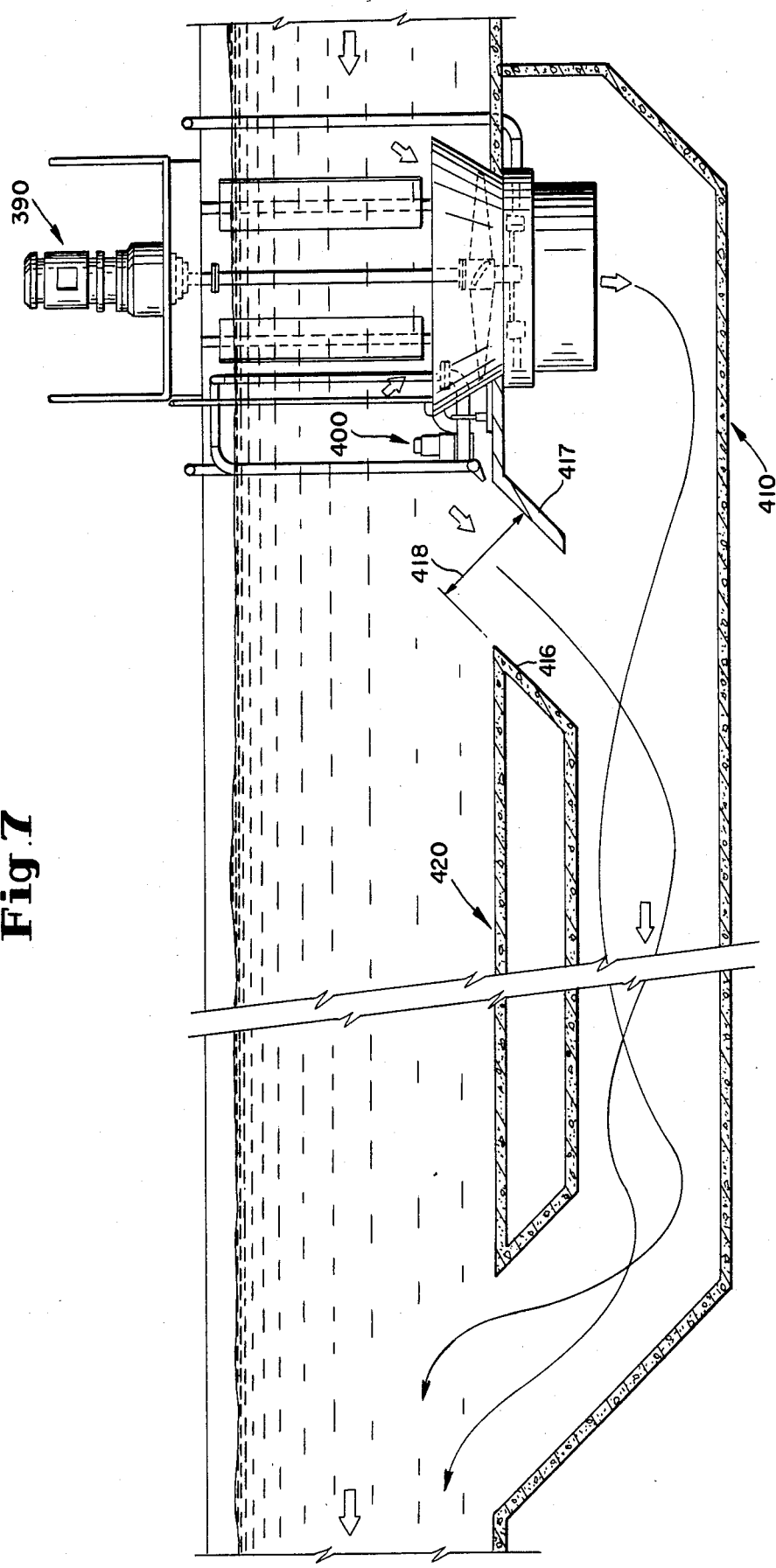

PARTIAL OR NON-BARRIERED OXIDATION DITCH HAVING MOMENTUM CONSERVATION AND INCREASED OXYGEN TRANSFER EFFICIENCY

CROSS REFERENCE TO RELATED APPLICATIONS

This application is a continuation-in-part of Ser. No. 433,638, filed Oct. 12, 1982, entitled "Barrier Oxidation Ditch Having Increased Flow Efficiency and Oxygen Transfer Efficiency", and now U.S. Pat. No. 4,585,555; which is a C-I-P of Ser. No. 361,205, filed Mar. 29, 1982, entitled "Method and Apparatus for Induced-Flow Circulation and Pressurized Aeration in a Barrier Oxidation Ditch", and now U.S. Pat. No. 4,455,232; which is a C-I-P of Ser. No. 75,412, filed Sept. 14, 1979, entitled "Conversion of Plug Flow and Complete Mix Aeration Basins to Barrier Oxidation Ditches", and now U.S. Pat. No. 4,394,268; which is a C-I-P of Ser. No. 28,383, filed Apr. 9, 1979, entitled "Conservation of Momentum in a Barrier Oxidation Ditch", and now U.S. Pat. No. 4,278,547; which is a C-I-P of Ser. No. 848,705, filed Nov. 4, 1977, entitled "Flow Control Apparatus and Process for an Oxidation Ditch", and now abandoned; which is a continuation-in-part of Ser. No. 649,995, filed Jan. 19, 1976, entitled "Flow Control Apparatus and Method for Aerobic Sewage Treatment" of John Hager Reid, now abandoned.

BACKGROUND OF THE INVENTION

1. Field of the Invention

This invention relates to wastewater treatment. The invention especially relates to methods and apparatuses for clarifying mixed liquor in activated sludge processes that are conducted in partial or non-barriered oxidation ditches of racetrack or loop channel configuration.

2. Review of the Prior Art

Oxidation ditches for continuous aerobic treatment of liquid wastewaters have been used since the early 1950's. They were developed in Hollaand by Dr. Ir A. Pasveer, as a variation of the activated sludge process, and were patented in Dutch Pat. No. 87,500 and British pat. No. 796,438.

Barrier oxidation ditches have been operating since 1977, primarily for treating municipal and poultry processing wastewaters. Barrier oxidation ditches are described in U.S. Pat. No. 4,260,486 of John H. Reid, which is fully incorporated herein by reference. A barrier oxidation ditch comprises an endless channel, a barrier disposed athwart the channel, a vertically mounted pump having an impeller within a draft tube which is vertically mounted at the upstream side of the barrier, a J-shaped discharge duct which is flow-connected to the draft tube and is mounted below the bottom of the channel and below the barrier to provide a discharge on the downstream side thereof, and an aeration means which includes a sparge disposed beneath the impeller, and, if needed, diffusers which are removably mounted so that they introduce additional diffused air at about the bottom of the discharge duct. This barrier oxidation ditch, which pumps all of the circulating mixed liquor past the barrier, is herein described as a total barrier oxidation ditch.

It has further been ascertained that the barrier oxidation ditch of U.S. Pat. No. 4,260,486 creates a differential hydraulic head that is readily measurable when the flow is being pumped through one or more draft tubes and discharge ducts, thereby indicating that there exists a dammed-up momentum in the mixed liquor which is approaching the barrier. It is important to release the energy contained in the dammed-up momentum.

An improved barrier oxidation ditch is disclosed in U.S. Pat. No. 4,278,547 of John H. Reid; it is also incorporated herein by reference. This ditch comprises a barrier having adjustably sized openings and/or gateways therethrough for conserving the momentum of the mixed liquor, a pump means for pumping most of the liquor past the barrier, and an aeration means for aerating the pumped liquor and for selectively aerating the induced-flow liquor passing through the openings so that there is no backmixing of aerated liquor and relatively little heterogeneous aeration when the aerated liquor is blended, downstream of the barrier, with the unaerated induced-flow liquor. This barrier oxidation ditch, which pumps a portion of the circulating mixed liquor past the barrier and provides openings for the remainder to move through the barrier, is herein described as a partial barrier oxidation ditch.

One of the major benefits of the barrier oxidation ditch of U.S. Pat. No. 4,260,486 is that the sparge in the downdraft tube provides for introducing diffused air to the mixed liquor at a shallow depth, thereby forming an air-liquor mixture, and then for pumping this mixture downwardly with its impeller into the discharge duct to a sub-channel oxygen-transfer depth that is below the channel bottom. This oxygen-transfer depth increases the driving force for transferring oxygen molecules across the films at the gas-liquid interfaces of the air bubbles. Other additional benefits of great practical importance are: (1) the energy required for downwardly pumping the air-liquor mixture is considerably less than the energy required for downwardly pumping the liquor alone plus the energy required for separately compressing air to the hydraulic pressure existing at the oxygen-transfer depth; and (2) a very high level of turbulence is provided in the oxygen-transfer zone, measured by brake horsepower/1000 $ft^3$.

For any aeration system used in transferring oxygen to a particular wastewater, sewage, or mixed liquor, its oxygen transfer efficiency is a function of five major parameters: bubble size, bubble retention time, driving force across the air-liquid interface for the dissolved oxygen, hydrostatic pressure, and degree of turbulence in the oxygen-transfer zone. However, the adjustable gateways through the barrier of U.S. Pat. No. 4,278,547 allow the induced-flow portion of the mixed liquor to pass through the barrier and be selectively aerated at a depth above the channel bottom instead of at the sub-channel depth that is available within a discharge duct, thereby losing at least some of the advantages of retention time, driving force, hydrostatic pressure, and turbulence.

U.S. Pat. No. 4,455,232 of John H. Reid accordingly discloses a barriered circulator/aerator in the endless channel of a barrier oxidation ditch which provides a directly pumped flow of mixed liquor into a central liquor inlet zone and an induced flow of mixed liquor into a surrounding liquor inlet zone at the inlet of a deep oxygen contact duct which passes beneath the barrier to the discharge channel on the downstream side thereof. It further provides mixing of diffused air with the directly pumped flow and/or the induced flow and then moving the combined air-liquor flows into the deepest portion of the contact duct where point-source pressurized aeration of both flows occurs. Eddy jet diffusers are preferably used for aerating the induced flow. Oxygen transfer efficiencies are obtained that are 1.6 to 2.2 times as great per brake horsepower per hour as that attainable by 100% pumping of the mixed liquor in a total barrier oxidation ditch, as disclosed in U.S. Pat. No. 4,260,486.

This improved barrier oxidation ditch, however, compels 100% of the flow, both pumped and induced, to change direction 90° while moving downwardly and then to change direction 135° while moving beneath the barrier and upwardly. As is well known in hydraulic theory, such 225° of direction changing causes significant energy consumption. It would be desirable to provide a means for passing the liquor from the intake portion of the endless channel to the discharge portion of the channel with minimum directional change.

When the air-liquor mixture has reached the lowest portion of the discharge duct, there is also very little time available for oxygen transfer from bubble to liquor across the films of the liquor-gas interface before the liquor/air mixture begins to rise. Yet, it is at this point in passage from the intake channel that transfer efficiency is highest because of maximum hydrostatic pressure. Another factor of importance is that the microorganisms are in oxygen-starved condition and avidly utilize the oxygen as fast as it transfers across the liquor-air films into the bulk liquor, so that the bulk liquor cannot become saturated if the MLSS content is reasonably high. An unusually large proportion of the oxygen in the bubbles is accordingly able to transfer across the films into the bulk liquor. It would accordingly be desirable to prolong the bubble retention time at the maximum depth, even though lengthening the discharge duct may tend to waste the available land area.

SUMMARY OF THE INVENTION

It is, therefore, an object of this invention to provide a method and a means for minimizing the directional change of the liquor while it is passing from the intake portion of the endless channel to the discharge portion of the channel.

It is also an object to provide a method and means for prolonging the bubble retention time at maximum hydrostatic pressure while conserving a portion of the momentum of the mixed liquor entering the intake channel.

The first objective is attained according to the principles of this invention by providing an induced-flow duct which is inclined at an acute angle to the horizontal and is connected at its upper end to a separate induced-flow inlet which is disposed downstream or upstream of the draft tube and the pump or even alongside thereof. This inclined duct is connected at its lower end to the pumped-flow discharge duct at approximately its maximum depth, thereby initiating a combined-flow portion of the discharge duct, whereby venturi activity boosts the induced flow and supplies additional pumping power.

The induced-flow inlet may be either oval or rectangular in plan view, and the inclined duct may correspondingly be either circular, square, or rectangular in sectional view. The rectangular duct is preferably designed as a narrow slot which is transversely disposed across the intake channel and adjacent to the barrier; its height in sectional view may be 10%–50% of the average depth within the endless channel. The advantage of using a slot as the inclined duct for the induced flow is that there is less sidewise shifting and/or by-passing of flow in the discharge channel. This advantage is especially pertinent if the discharge duct for the pumped flow fans and flattens out to meet it. In addition, the combined pumped and induced flows within the combined-flow section of the discharge duct are fully developed in the desired direction and are subject to less random turbulence.

The second objective is attained according to the principles of this invention by providing an intermediate channel portion, between the intake and discharge channels, which functions as a partial barrier oxidation ditch and conserves a selected portion of the momentum of the mixed liquor entering the intake channel. This intermediate channel portion may have a partial barrier in the form of a water barrier. Alternatively, it may comprise a baffle extending up from the bottom of the channel portion or, preferably, down from the surface so that a slot is provided near the surface or, preferably, near the bottom for induced-flow liquor to sweep therethrough and preserve a portion of the momentum that is available in the mixed liquor as it enters the intake channel.

The height of this rectangular combined-flow portion is preferably less than the depth of the liquor in the endless channel under average conditions but may be selectively designed to be from one-fifth to the full channel depth under average conditions. The velocity of the air-liquor mixture is consequently at least equal to the velocity in the channel and may be at least five times as much. Such increased velocity is generally preferred because it tends to prevent the bubbles from rising and coalescing by maintaining turbulent flow conditions. Baffles and bubble-splitting devices can also be installed in the combined-flow portion of the duct so as to maintain the bubbles at minimum size.

The partial barrier or baffle and even the non-barriered oxidation ditch of this invention has means for translationally directing a first portion of the mixed liquor and thereby conserving a portion of the momentum of the translationally flowing mixed liquor as unaerated induced flow liquor and also has a means for smoothly and downwardly directing a second portion of the mixed liquor and thereby at least partially conserving another portion of the momentum as the second portion is contacted, while at a depth greater than the depth of the bottom of the endless channel, with a mixture of a third portion and dispersed bubbles of an oxygen-containing gas, the third portion being pumped downwardly prior to formation of the mixture.

The momentum-conserving oxidation ditch of this invention provides a means for utilizing a portion of the momentum of the translationally moving mixed liquor for moving a second portion of the mixed liquor to a selected oxygen-transfer depth at which it can intermix with a pumped and bubble-containing third portion of the mixed liquor to form a homogeneously aerated mixed liquor which then intermixes, within the channel, with a first portion of the mixed liquor, after it has moved translationally while conserving an additional portion of the momentum, to form a heterogeneously mixed liquor.

BRIEF DESCRIPTION OF THE DRAWINGS

The inventio may be readily understood by referring to the drawings, in which FIGS. 2, 3 and 5–7 show a portion of a partial barrier oxidation ditch having slab-sided discharge passages, and FIGS. 1, 2, and 4 show portions of partial barrier oxidation ditches having cylindrical passages. FIGS. 2–4 and 7 show induced-flow ducts which are downstream of the circulator/aerator, but FIGS. 5 and 6 shown an induced-flow duct which is upstream thereof.

FIG. 1 is a sectional elevational view of a partial barrier oxidation ditch in which both the downdraft tube of the circulator/aerator and the inclined induced-flow duct are flow connected to a discharge duct of circular cross-section.

FIG. 2 is a plan view of the apparatus shown in FIG. 1.

FIG. 3 is a sectional elevational view of a partial barrier oxidation ditch which has an underlying discharge zone and an adjustable gateway for controlling the amount of liquor entering the slot-shaped induced-flow duct and the amount of induced-flow liquor moving past the gateway.

FIG. 4 is a sectional elevational view of a partial barrier oxidation ditch which is similar to the ditch of FIGS. 1 and 2 except that a fixed baffle is above the rectangularly shaped combined-flow section of the discharge duct, after junction of the discharge duct with the inclined induced-flow duct, and controls the amount of liquor sweeping past the upstream wall of the rectangular induced-flow duct.

FIG. 5 is a sectional elevational view of a partial barrier oxidation ditch having a U-shaped induced-flow duct, having an inlet which is disposed upstream of the draft tube, into which the curved downdraft tube projects at maximum depth so that the duct thereafter becomes a combined-flow duct.

FIG. 6 is similar to FIG. 5 except that the combined flow duct has the same depth as the diameter of the curved draft tube.

FIG. 7 is similar to FIG. 3 except that there is no physical barrier, a water barrier having sufficient length to prevent backmixing being alternatively relied upon.

DESCRIPTION OF THE PREFERRED EMBODIMENTS

The barrier oxidation ditch of this invention has a separate induced-flow duct which is upstream or downstream of the circulator/aerator and which is connected to the discharge duct at its maximum depth. An eddy jet header, or other type of $O_2$-containing gas diffuser, is optionally disposed at the inlet of the induced-flow duct. In consequence, the induced flow, bearing dispersed air bubbles from the eddy jets, joins the pumped flow at full depth and can be regulated separately from the pumped flow.

Figure 1:
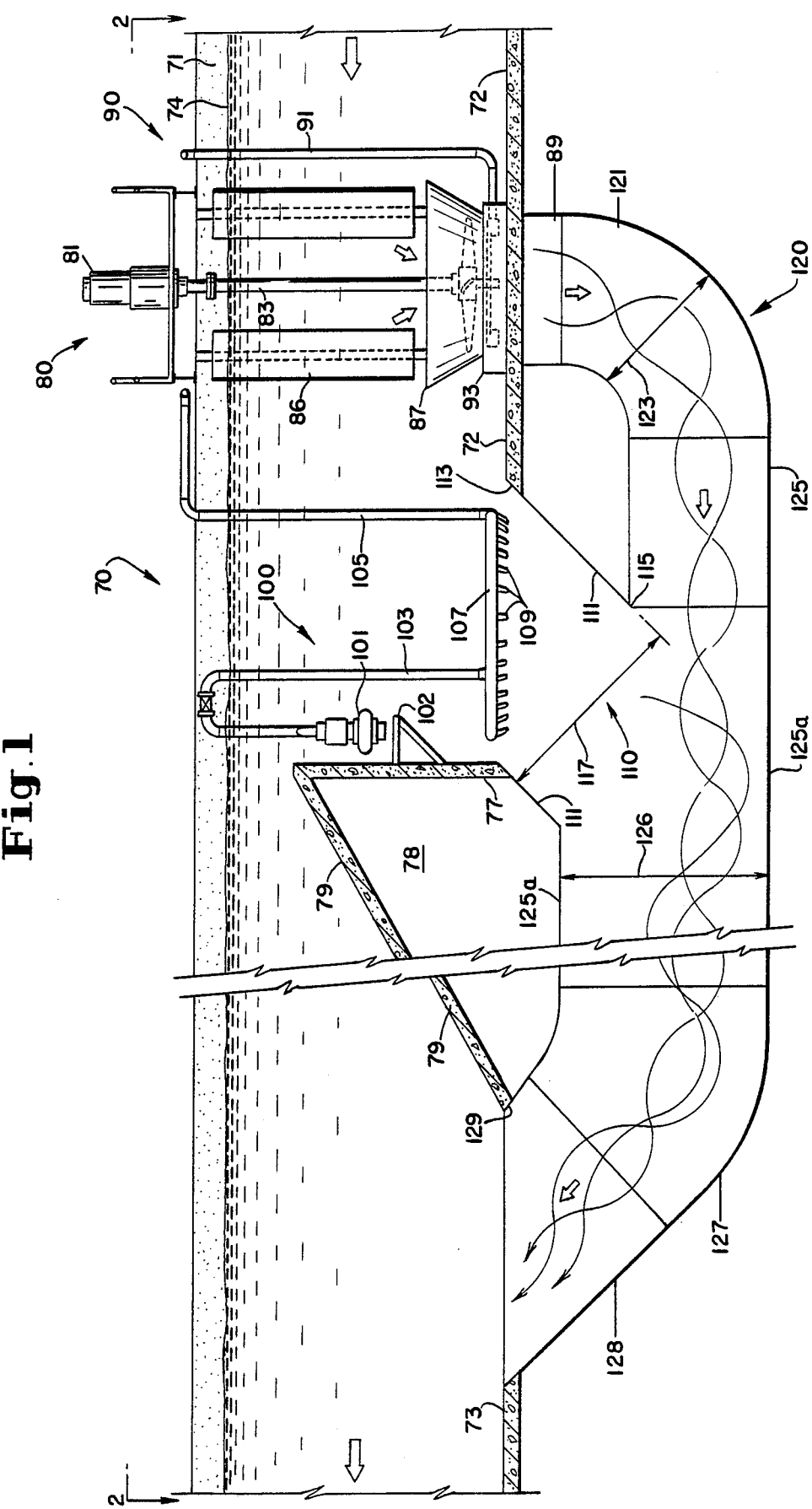
Figure 2:
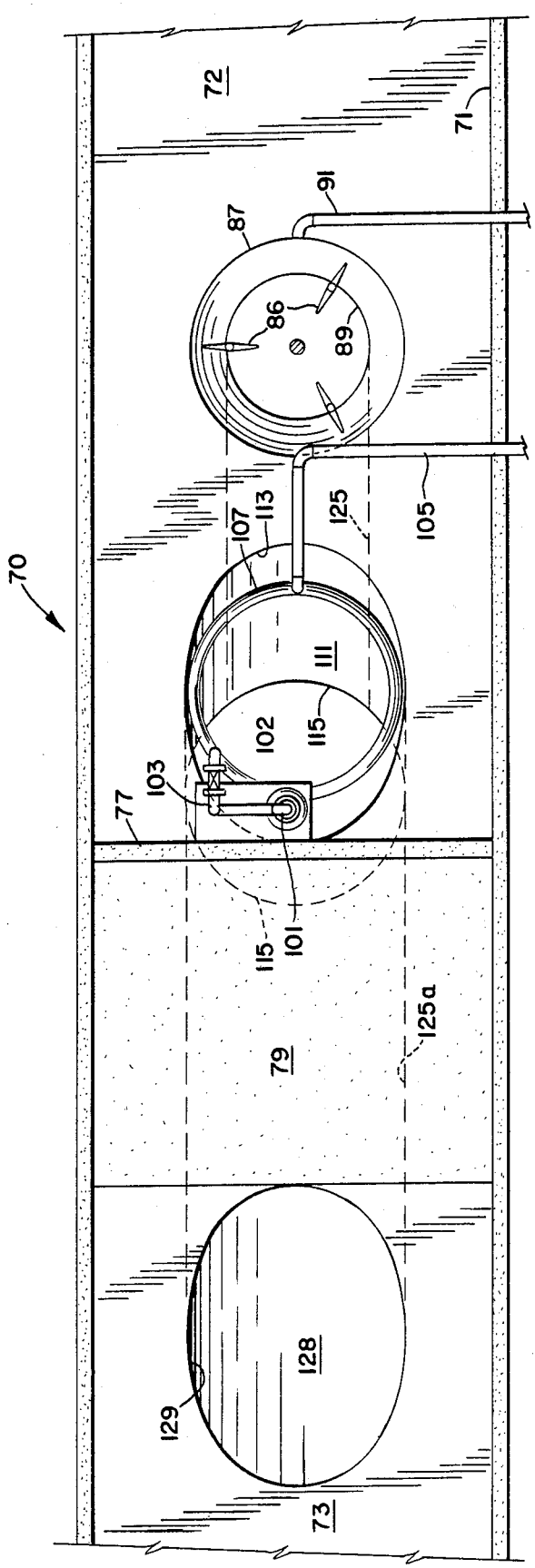
Figure 3:
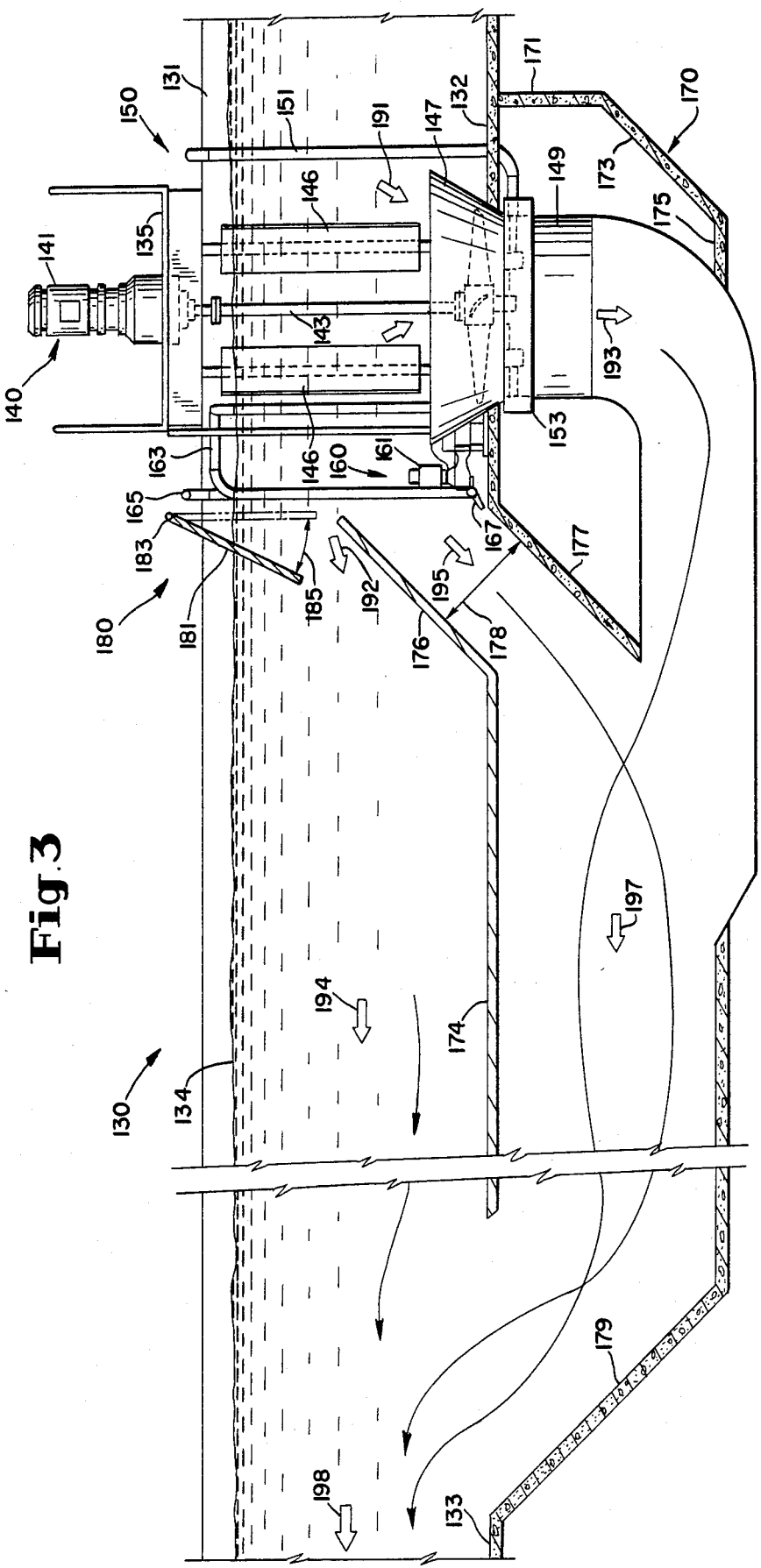
Figure 4:
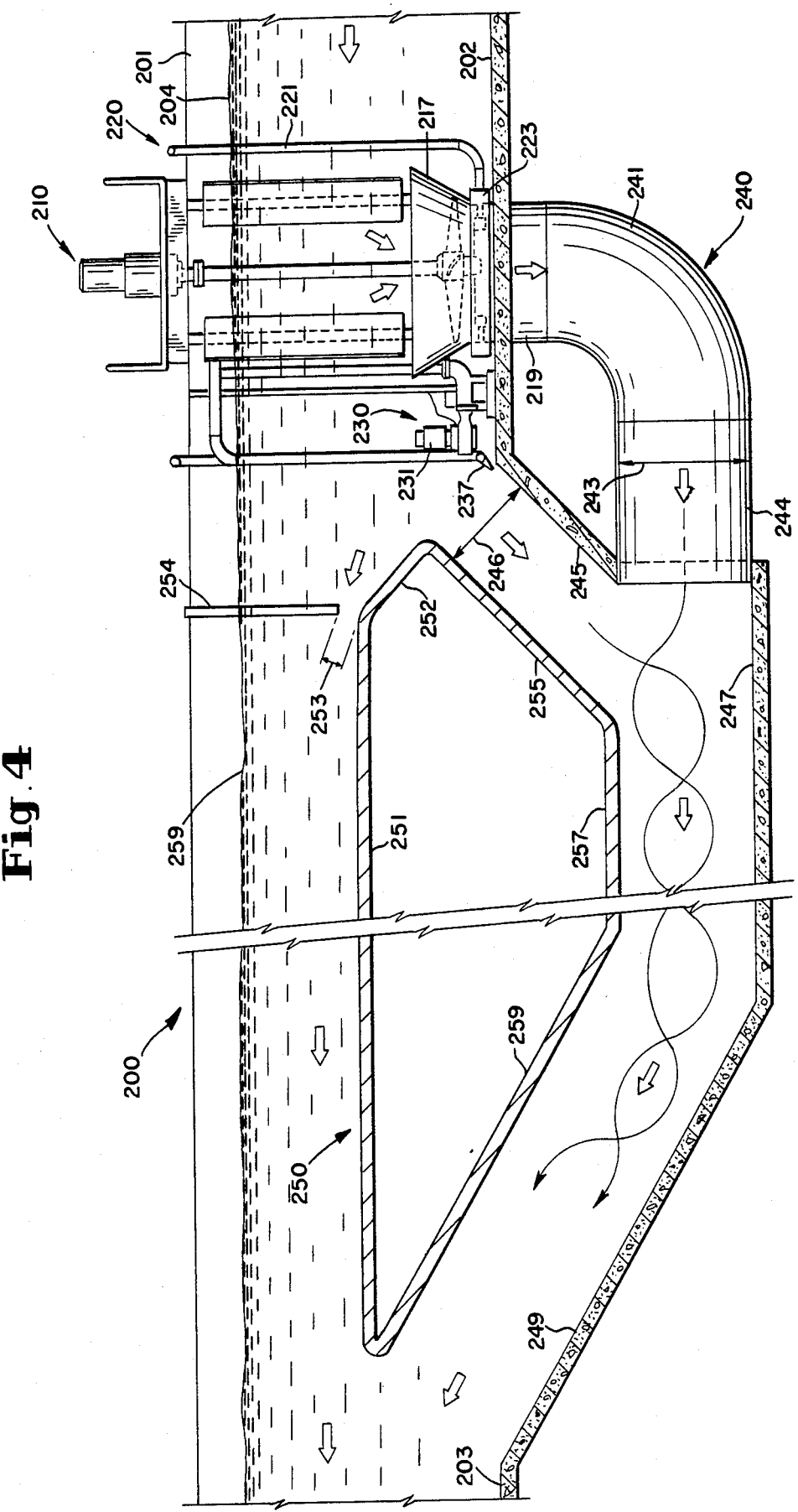
Figure 5:
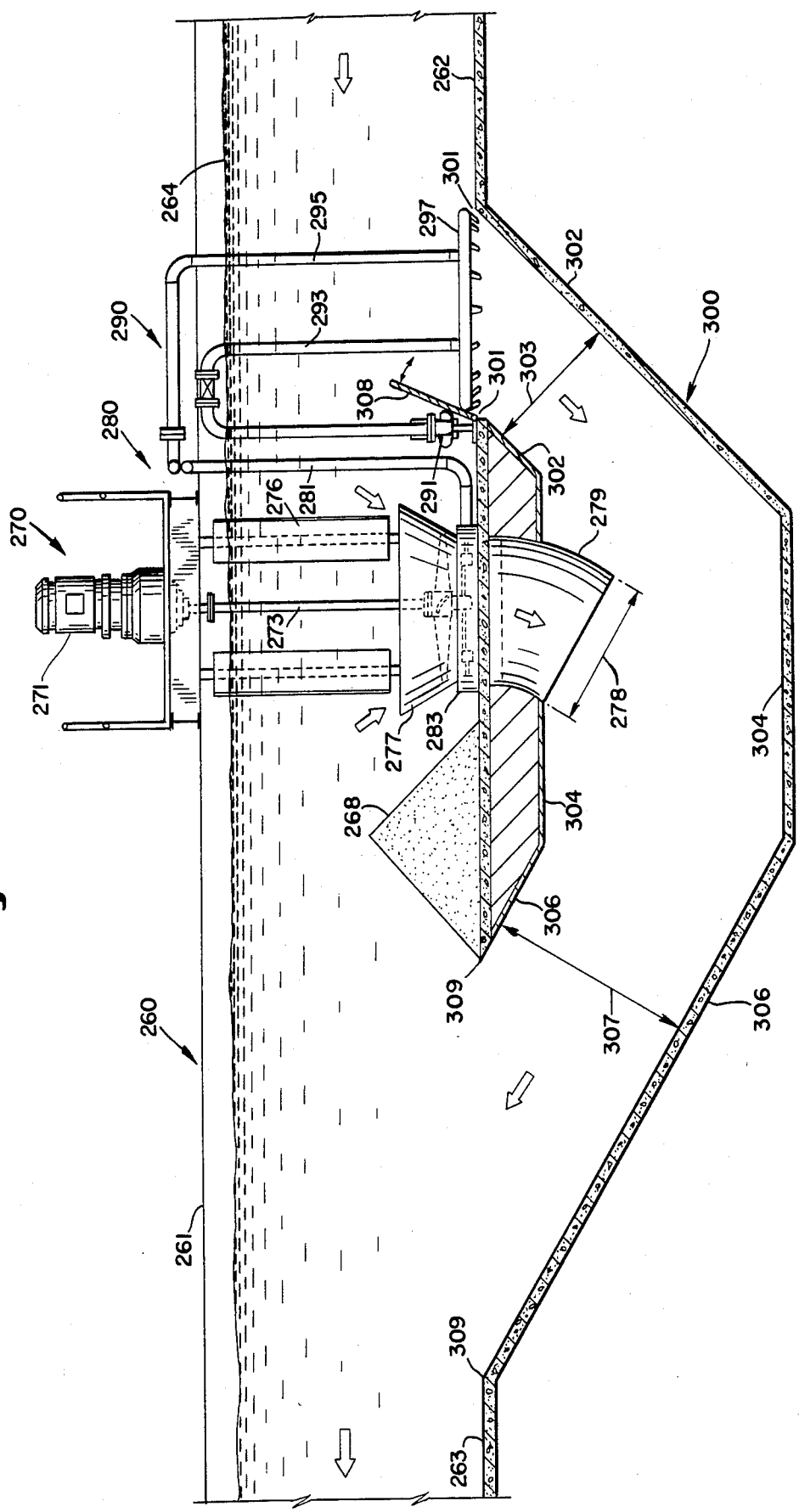

The induced-flow duct, as seen in FIGS. 1, 2 and 5, can be cylindrical in shape and can be connected to a cylindrical discharge duct. Preferably, however, the induced-flow duct is slot-shaped, as seen in FIGS. 3 and 4. The U-shaped duct of FIG. 5 can be cylindrical, oval, or rectangular, for example, in cross-section.

Barrier oxidation ditch 70, shown in FIGS. 1 and 2, comprises sides 71, intake channel bottom 72, discharge channel bottom 73, average liquor surface 74, vertical barrier 77, filled-in area 78, discharge slope 79, a circulator/aerator 80, a sparge assembly 90, an eddy jet assembly 100, an induced-flow duct 110, and a discharge duct 120. Circulator/aerator 80 comprises a motor and reduction gear 81 to which its shaft 83 is attached, vanes 86, an intake funnel 87, and a downdraft tube 89. Sparge assembly 90 comprises an air supply line 91 and a sparge header 93. Eddy jet assembly 100 comprises a submersible pump 101 which is attached to a small stand 102, a liquor supply line 103 which is connected to pump 101, an air supply line 105, a circular header 107 to which lines 103 and 105 are flow connected, and a plurality of eddy jets 109.

Induced-flow duct 110 has a circular side 111, upper edge 113, lower edge 115, and diameter 117. Discharge duct 120 comprises a 90° section 121 having diameter 123 which is flow connected to downdraft tube 89, a straight section 125 which is flow connected to section 121 and enlarges to diameter 126 after juncture with duct 110, a 45° section 127, and a terminal section 128 having an oval junction 129 with bottom 73 of the discharge channel. The combined-flow portion of discharge duct 120 underlies filled-in area 78.

Barrier oxidation ditch 130, shown in FIG. 3, comprises sides 131, bottom 132 of the intake channel, bottom 133 of the discharge channel, average liquor surface 134, at least one circulator/aerator 140, a sparge assembly 150, an eddy jet assembly 160, and a discharge duct 170. Circulator/aerator 140 comprises a motor and reduction gear 141, a shaft 143 connected thereto, vanes 146, an intake funnel 147, and a downdraft tube 149. Sparge assembly 150 comprises an air supply line 151 and a sparge header 153. Eddy jet assembly 160 comprises a pump 161, a liquor supply line 163, an air supply line 165, and an eddy jet header 167.

Discharge duct 170 comprises an upstream wall 171, an inclined wall 173, a bottom 175, an upstream wall 177 of the slot-shaped induced-flow duct, and a discharge ramp 179. The bottom 174 of the intermediate channel portion is also the upper surface of the combined flow section of discharge duct 170 after juncture with the induced-flow duct. The rectangular induced-flow duct, between walls 177 and 176, has width 178.

Adjustable swinging gate assembly 180 includes gate 181 which is swingably supported on hinge 183 through arc 185. Even when fully closed, gate 181 never fully blocks the translational flow of the mixed liquor.

The pumped flow pattern in FIG. 3 includes intake flow 191, pumped discharge flow 193, induced flow 195, combined flow 197, and discharge flow 198. The induced-flow pattern includes bypass flow 192 beneath gate 181, flow 194 above bottom 174, and heterogeneous discharge flow 198, formed by mixture of flows 194 and 197. The entire length of discharge duct 170 beneath bottom 174 is the combined-flow portion of this duct.

The partial barrier oxidation ditch 200 shown in FIG. 4 has an endless channel with sides 201, an intake channel portion with bottom 202, a discharge channel portion with bottom 203, and average liquor level 204. Ditch 200 also comprises a circulator/aerator 210, a sparge assembly 220, an eddy jet pump assembly 230, a discharge duct 240, and a baffle 254 which may be fixed and unadjustable to provide a flow gap 253, as shown, or be slideably, swingably, or otherwise adjustable.

Circulator/aerator 210 comprises an intake funnel 217 and a downdraft tube 219. Sparge assembly 220 comprises an air supply line 221 and a sparge header 223. Eddy-jet pump assembly 230 comprises a submerged pump 231 and an eddy-jet header 237.

Discharge duct 240 comprises a 90° section 241, a straight fan-out section 244 having flat sides, bottom, and top having height 243. The induced-flow duct has an inclined wall 245 as its upstream wall. Section 244 is preferably fan-shaped from the circular outlet of section 241 to the channel-side bottom of wall 245 and the channel-wide upstream edge of bottom 247.

Induced-flow regulating member 250 is rigidly attached to sides 201. Member 250 can be formed of any suitable material, such as concrete. When made of steel, it is suitably filled with a solution of deaerated clean water and an anti-rust compound and can contain enough nitrogen to have neutral buoyancy. Member 250 comprises a top surface 251, a by-pass surface 252, a duct surface 255, a bottom surface 257, and a discharge surface 259. The induced-flow duct, between wall 245 and duct surface 255, has width 246. Bottom surface 257 also functions as the top surface of the combined-flow portion of discharge duct 240 after juncture with the induced-flow duct.

The partial barrier oxidation ditch 260 shown in FIG. 5 has an induced-flow inlet which is upstream of its circulator/aerator 270 for release of a portion of the dammed-up momentum in the intake channel. Partial barrier oxidation ditch 260 has an endless channel with sides 261, an intake channel with bottom 262, a discharge channel with bottom 263, average liquor level 264, and baffle 268 which can be of any desired height for preservation of any desired fraction of the momentum in the translationally flowing liquor. Ditch 260 also comprises a circulator/aerator 270, a sparge assembly 280, an eddy-jet assembly 290, and an induced-flow/discharge duct 300.

Circulator/aerator 270 comprises a motor and reduction gear 271, a shaft 273 which is connected thereto, vanes 276, and a curved downdraft tube 279 having diameter 278. Sparge assembly 280 comprises an air supply line 281 and a sparge header 283. Eddy jet assembly 290 comprises a pump 291, a liquor supply line 293, an air supply line 295, and an eddy-jet header 297.

Induced-flow/discharge duct 300 comprises an induced-flow inlet having edges 301, an induced-flow portion 302, a venturi or mixing portion 304, a combined-flow portion 306, and an outlet having edges 309. Induced-flow portion 302 has width 303, and combined-flow portion 306 has width 307. An inclined intake baffle 308, which is semicircular if induced-flow portion 302 is circular, is attached to upstream edge 301. Preferably, baffle 308 is adjustable and is provided with a control means which is operable from the surface. The inlet and the outlet of duct 300 may have any desired shape, from circular to rectangular.

Duct 300 is preferred because of its minimum directional change for the induced flow, its capability of "pulling" the induced flow with the pumped flow, the gradualness of its bends, and the capability of locating its inlet at any desired distance upstream, whereby contact with the bubbles can be selectively prolonged. As with any other eddy-jet assembly 100, 160, 230, the air bubbles issuing from the jets cn be adjusted in size. By employing very small bubbles, a comparatively slow current entering the inlet can be used to carry them down, and an additional advantage is obtained because their comparatively large surface area enhances oxygen transfer to the bulk of the mixed liquor. Venturi portion 304 can be of any desired length.

Figure 6:
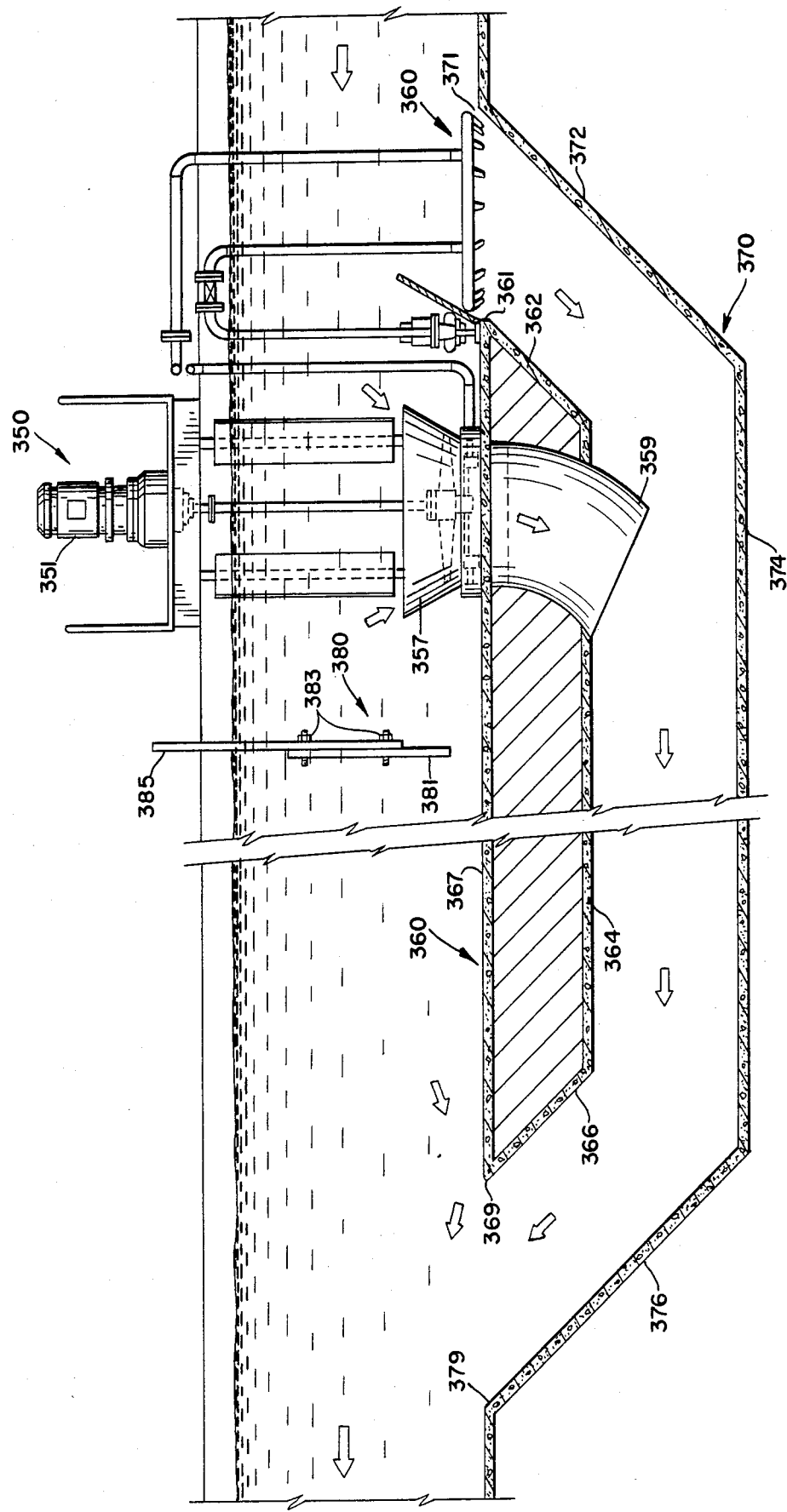

Circulator/aerator assembly 305, eddy-jet assembly 360, discharge duct 370, and downstream baffle 380 that are shown in FIG. 6 are similar to the corresponding elements shown in Figure 5. Aerator bridge 360 extends from edge 361 to edge 369 and from upper surface 367, in parallel with the bottom of the intake and discharge channels, to lower surface 364. Discharge duct 370 comprises an inlet having edges 361, 371 at its intersection with the bottom of the intake channel, an induced-flow portion 362, 372, a combined-flow portion 364, 374, a discharge portion 366, 376, and an outlet having downstream edges 369, 379 at its intersection with the bottom of the discharge channel. Combined-flow portion 364, 374 must be appreciably wider than the diameter of downdraft tube 359 and is preferably as wide as the intake channel. The height of duct 370, between portions 364, 374 may be equal to the diameter of curved downdraft tube 359, as shown in FIG. 6, but is preferably greater. The flow patterns for the barrier oxidation ditch of FIG. 6 are essentially the same as the patterns for the partial barrier oxidation ditch of FIG. 5.

Adjustable baffle 380 is mounted approximately above surface 367 and comprises a slideable portion 381, bolts 383, and a fixed portion 385. Bolts 383 pass through holes in one portion and slots in the other. Baffle 380 may selectively be a swingable device, such as baffle 180, or a fixed device, such as baffle 251. Baffle 380 may alternatively be mounted farther upstream, such as immediately downstream of funnel 357. After operation of a partial barrier oxidation ditch (PBOD) for a period of time, portion 381 may be suitably fixed in place, at least for a season of the year, and need not be further adjusted.

Circulator/aerator assembly 390, eddy-jet assembly 400, and discharge duct 420 in FIG. 7 are similar to corresponding elements in FIG. 3. An induced flow duct, between walls 416 and 417, has width 418. However, aerator bridge 420 has an upper surface in parallel to the bottom of the intake and discharge channels. Although a fixed or adjustable baffle may be mounted above its uppoer surface or a hump-type baffle, such as baffle 268, may be mounted thereon at any selected distance from the inlet, this embodiment is shown as an illustrative example of using a water barrier for obviating restraints to induced flow of the liquor while preventing back mixing of the liquor to the pump/aerator by the designed length of bridge 420.

Because it will be readily apparent to those skilled in the wastewater treatment art that innumerable variations, modifications, applications, and extensions of the examples and principles hereinbefore set forth can be made without departing from the spirit and the scope of the invention, what is herein defined as such scope and is desired to be protected should be measured, and the invention should be limited, only by the following claims.

What is claimed is:

1. In a partial or non-barriered oxidation ditch comprising an endless channel having a bottom, at least one circulator/aerator comprising:
   A. a pump/aerator including:
      (1) a draft tube in fluid communication with said channel,
      (2) an impeller operably mounted within said draft tube, and
      (3) air sparge mens disposed beneath said impeller;
   B. an induced-flow duct having an inlet at one end which is in fluid communication with said channel, said induced-flow duct being downwardly inclined in a downstream direction at a predetermined acute angle in the range of approximately 30°–60° below horizontal and having an outlet at the other end;
   C. a discharge duct disposed to pass beneath said bottom at a selected maximum depth, said discharge duct comprising:

(1) a pumped flow portion in fluid communication with said channel through said draft tube, said pumped flow portion having an outlet end, and (2) a combined flow portion having an inlet at one end which is in fluid communication with the outlet end of said pumped flow portion and the outlet end of said induced flow duct, and having a terminal segment at the other end which is fluid communication with said endless channel, downstream of said inlet.

2. A circulator/aerator in accordance with claim 1 wherein the inlet of said induced flow duct is disposed upstream of said draft tube.

3. A circulator/aerator in accordance with claim 2 wherein the inlet of said induced flow duct is formed in the shape of a slot which is transversely disposed across at least a portion of said endless channel.

4. A circulator/aerator in accordance with claim 3 wherein said slot has a height which is substantially equal to 10% to 50% of the average depth of liquid in said endless channel.

5. A circulator/aerator in accordance with claim 3 wherein said combined flow portion of said discharge duct is substantially rectangular in cross-section and has a width which is substantially equal to or greater than the width of the pumped flow portion of said discharge duct.

6. A circulator/aerator in accordance with claim 5 wherein said rectangularly shaped combined flow portion has a height which is substantially equal to 20% to 100% of the average depth of liquid inside intake channel.

7. A circulator/aerator in accordance with claim 2 wherein said combined flow portion of said discharge duct is disposed at a vertical depth greater than the depth of the bottom of said endless channel.

8. A circulator/aerator in accordance with claim 7 wherein said terminal segment of said combined flow duct extends upwardly to said bottom of said endless channel.

9. A circulator/aerator in accordance with claim 8 wherein said combined flow portion of said discharge duct has a length which is substantially equal to at least 25 feet between the inlet end thereof and said terminal segment.

10. A circulator/aerator in accordance with claim 9, additionally comprising an eddy-jet header disposed proximate the inlet end of said induced flow duct.

11. A circulator/aerator in accordance with claim 1 wherein the inlet of said induced flow duct is disposed downstream of said draft tube.

12. A circulator/aerator in accordance with claim 11 wherein the inlet of said induced flow is formed in the shape of a slot which is transversely disposed across said endless channel.

13. A circulator/aerator in accordance with claim 12 wherein said slot has a height which is substantially equal to ten percent to fifty percent of the average depth of liquid in said endless channel.

14. A circulator/aerator in accordance with claim 13 wherein said combined flow portion of said discharge duct is substantially rectangular in cross-section and has a width which is substantially equal to or greater than the width of the pumped flow portion of said discharge duct.

15. A circulator/aerator in accordance with claim 14 wherein said rectangularly shaped combined flow portion has a height which is substantially equal to twenty percent to one hundred percent of the average depth of liquid in said endless channel.

16. A circulator/aerator in accordance with claim 14 wherein said combined flow portion of said discharge duct is disposed at a vertical depth greater than the depth of the bottom of said endless channel.

17. A circulator/aerator in accordance with claim 16 wherein said combined flow portion of said discharge duct has a length which is substantially equal to at least twenty-five feet between the inlet end thereof and the terminal segment.

18. A circulator/aerator in accordance with claim 17 additionally comprising an eddy-jet header disposed approximate the inlet end of said induced flow duct.

* * * * *